United States Patent
Span

(10) Patent No.: US 11,600,205 B2
(45) Date of Patent: Mar. 7, 2023

(54) DEVICE FOR INSERTING A TRANSPONDER

(71) Applicant: PERI SE, Weissenhorn (DE)

(72) Inventor: Wolfgang Span, Bellenberg (DE)

(73) Assignee: PERI SE, Weissenhorn (DE)

( * ) Notice: Subject to any disclaimer, the term of this patent is extended or adjusted under 35 U.S.C. 154(b) by 249 days.

(21) Appl. No.: 16/647,854

(22) PCT Filed: Sep. 12, 2018

(86) PCT No.: PCT/EP2018/074564
§ 371 (c)(1),
(2) Date: Mar. 16, 2020

(87) PCT Pub. No.: WO2019/053044
PCT Pub. Date: Mar. 21, 2019

(65) Prior Publication Data
US 2020/0219421 A1  Jul. 9, 2020

(30) Foreign Application Priority Data
Sep. 14, 2017  (DE) ..................... 10 2017 121 290.6

(51) Int. Cl.
*H01Q 1/18* (2006.01)
*G09F 3/18* (2006.01)
*H01Q 1/12* (2006.01)

(52) U.S. Cl.
CPC ............. *G09F 3/18* (2013.01); *H01Q 1/1207* (2013.01)

(58) Field of Classification Search
CPC ................................ G09F 3/18; H01Q 1/1207
USPC .......................... 29/592.1; 375/219, 295, 316
See application file for complete search history.

(56) References Cited

U.S. PATENT DOCUMENTS

| | | | |
|---|---|---|---|
| 6,239,737 B1 * | 5/2001 | Black | G06K 19/041 342/51 |
| 2006/0232412 A1 | 10/2006 | Tabacman | |
| 2011/0315777 A1 * | 12/2011 | Hakli | G06K 19/04 235/492 |

FOREIGN PATENT DOCUMENTS

| | | |
|---|---|---|
| DE | 10055060 | 5/2002 |
| DE | 10357695 | 7/2005 |
| DE | 102006029249 | 12/2007 |
| DE | 202008001549 | 5/2008 |
| DE | 202010005092 | 7/2010 |
| DE | 102010038474 | 12/2011 |
| DE | 202015002456 | 5/2015 |
| JP | 2000317931 | 11/2000 |
| WO | 2008098755 | 8/2008 |
| WO | 2014048954 | 4/2014 |

* cited by examiner

*Primary Examiner* — Zewdu A Kassa
(74) *Attorney, Agent, or Firm* — Wei & Sleman LLP

(57) ABSTRACT

A device for inserting a transponder into a slot of an object, the device being designed as an insert part which has approximately the length and width of the slot and which can be connected to the slot, and which has a receptacle for the transponder.

The task of designing an appropriate device in such a manner that the transponder to be inserted can be reliably positioned at the correct location of the slot is achieved in that the receptacle is arranged on the end of the insert part facing an end of the slot, and has a resilient web for clamping the transponder, when inserted, between a base of the insert part 4 and the resilient web, wherein the space between the web and the base is undersized with respect to the thickness of the transponder.

14 Claims, 8 Drawing Sheets

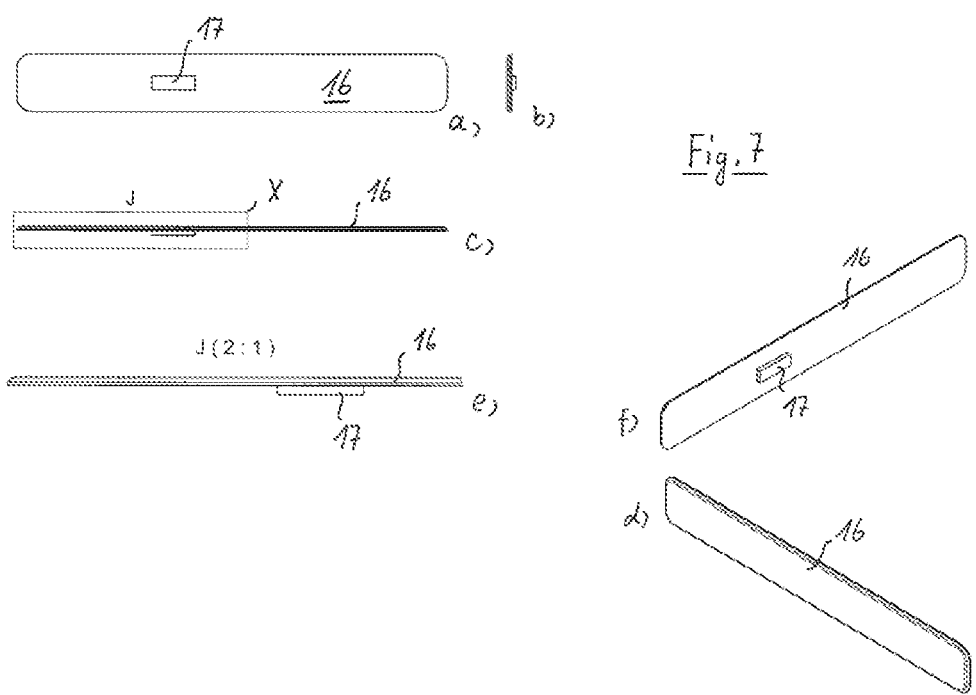

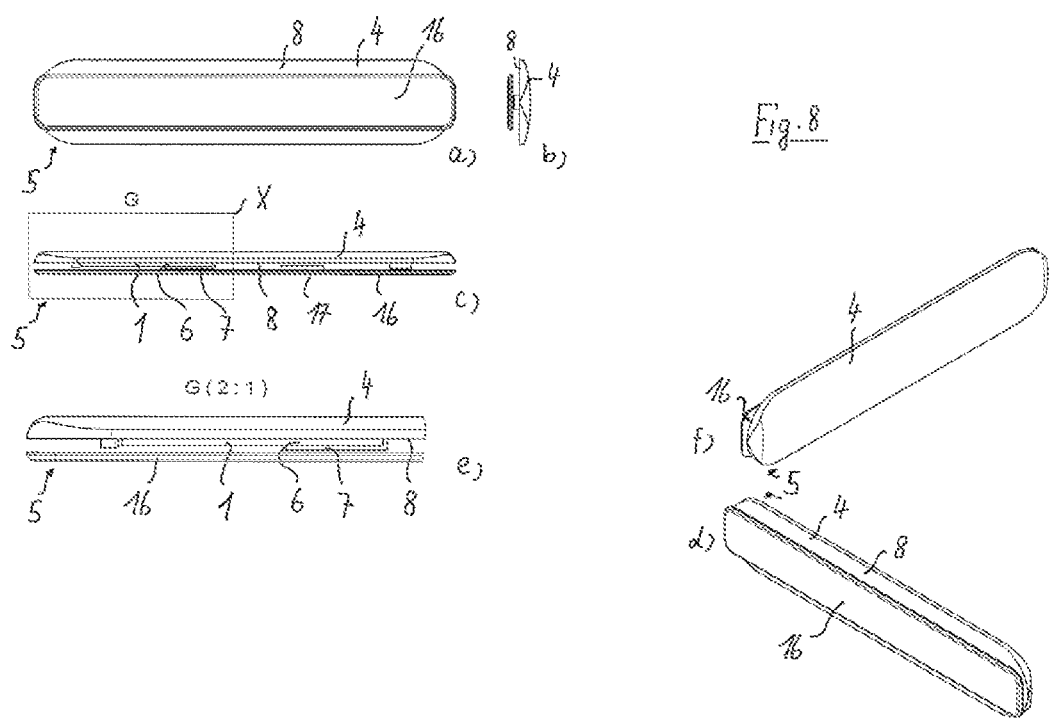

DEVICE FOR INSERTING A TRANSPONDER

FIELD OF THE INVENTION

The invention relates to a device for inserting a transponder into a slot of an object, to the use of such a device, and to a panel for formwork, equipped with such a device.

BACKGROUND OF THE INVENTION

The problem arises for various objects, in particular objects which are rented and which cannot be clearly identified because they do not have serial numbers, of easily identifying them—for example, to find out whether an identical rented object has been returned, or has been replaced prior to the return. Being able to detect such objects digitally, store their information in databases, and catalog them based on location are also desirable features.

Such objects can be equipped with optical codes to accomplish this. However, this is impossible in many sectors, or is associated with major disadvantages—for example, in the construction sector for the process of identifying scaffolding or formwork. These components are subject to considerable mechanical stress and are cleaned with high-pressure cleaners. Optical identifiers are therefore not strong enough for these components.

As such, the use of electronic identifiers in the form of RFID transponders is known from the prior art. For example, WO 2008/098755 A1 describes a formwork element having a formwork skin and having an outer frame made of metal, on which a recess is provided in which a transponder is arranged and retained.

DE 20 2010 005 092 U1 discloses an object having a recess and a transponder in this recess, the recess being formed by a container which is made of metal or plastics material.

DE 10 2010 038 474 A1 discloses a formwork element having a formwork frame and formwork skin, wherein an RFID transponder is attached to the back of the formwork skin.

DE 103 576 95 A1 discloses a slot antenna for a transponder, and US 2006/0232412 A1 discloses an RFID chip and a slot antenna.

WO 2014/048954 discloses a transportable device, in particular a formwork, which is equipped with a transponder which is arranged in a recess made of metal, the bottom of the recess being provided with a slot.

DE 10 2006 029 249 A1 discloses a device for inserting a transponder into a slot of an object, the device having approximately the length and width of the slot and having an insert part which receives the transponder.

DE 20 2008 001 549 U1 relates to an RFID transponder having a housing, a coupling loop which is electrically connected to an RFID chip arranged in the housing, and an antenna which has a slot and is arranged on the outside of the housing. In this case, the housing with the chip is placed on an object from the outside.

US 2006/0 232 412 A1 also deals with a reading system and a method for identifying goods with the aid of transponders, with particular reference being made to scaffolding material.

For the devices mentioned, the insertion of the transponder into the slot is difficult. Especially when the object to be marked has a cavity behind the slot, the transponder, the tag or the chip having the transponder can often fall through the slot into this cavity and disappear. It sometimes takes several attempts to fix a chip securely in the slot—for example, by gluing or soldering. Such a fixation also does not withstand the hard, continuous stress on objects that are used in the construction sector. In many cases, the glued or soldered chip comes off when the object is cleaned.

The problem therefore exists of designing a device for inserting a transponder into a slot of an object in such a way that the transponder to be used can be reliably positioned at the correct location of the slot.

SUMMARY OF THE INVENTION

This problem is addressed by a device for inserting a transponder into a slot of an object, the device being designed as an insert part which has approximately the length and width of the slot and which can be connected to the slot, and which has a receptacle for the transponder, characterized in that the receptacle is arranged on the end of the insert part facing an end of the slot, and has a resilient web for clamping the transponder, when inserted, between a base of the insert part and the resilient web, wherein the space between the web and the base is undersized with respect to the thickness of the transponder. Advantageous embodiments, and also the use of such a device and a method for inserting such a device into the slot of an object are the subject matter of the dependent claims.

BRIEF DESCRIPTION OF THE DRAWINGS

An embodiment of the invention is described below with reference to the accompanying drawings, wherein.

Figure 4:
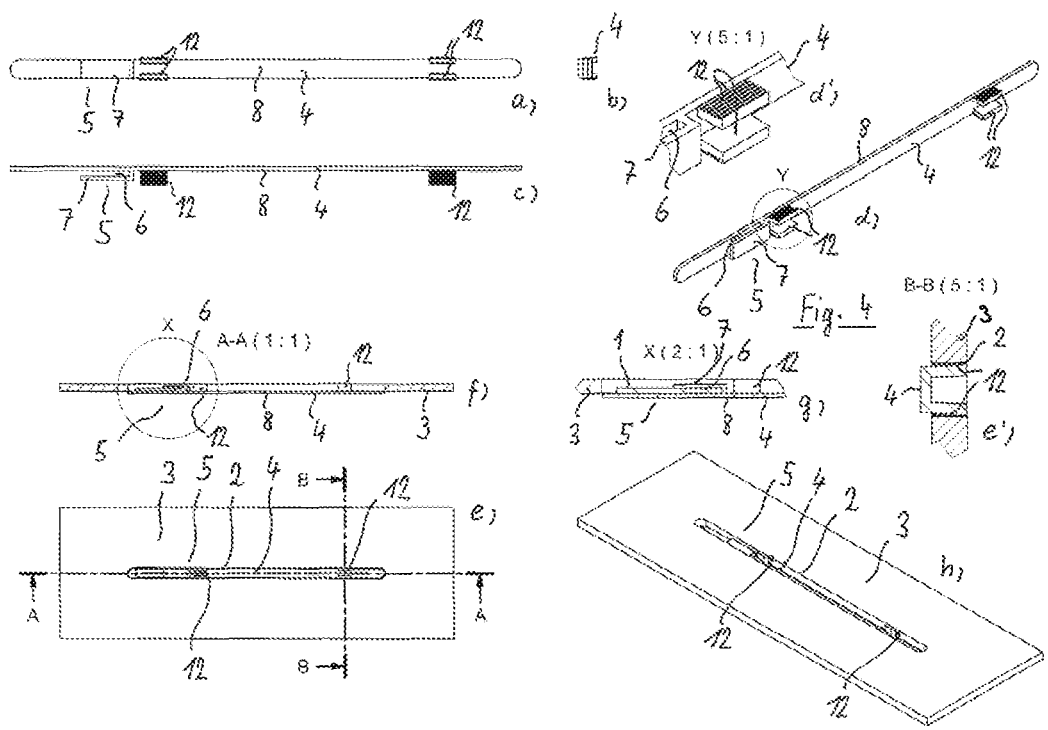
Figure 5:
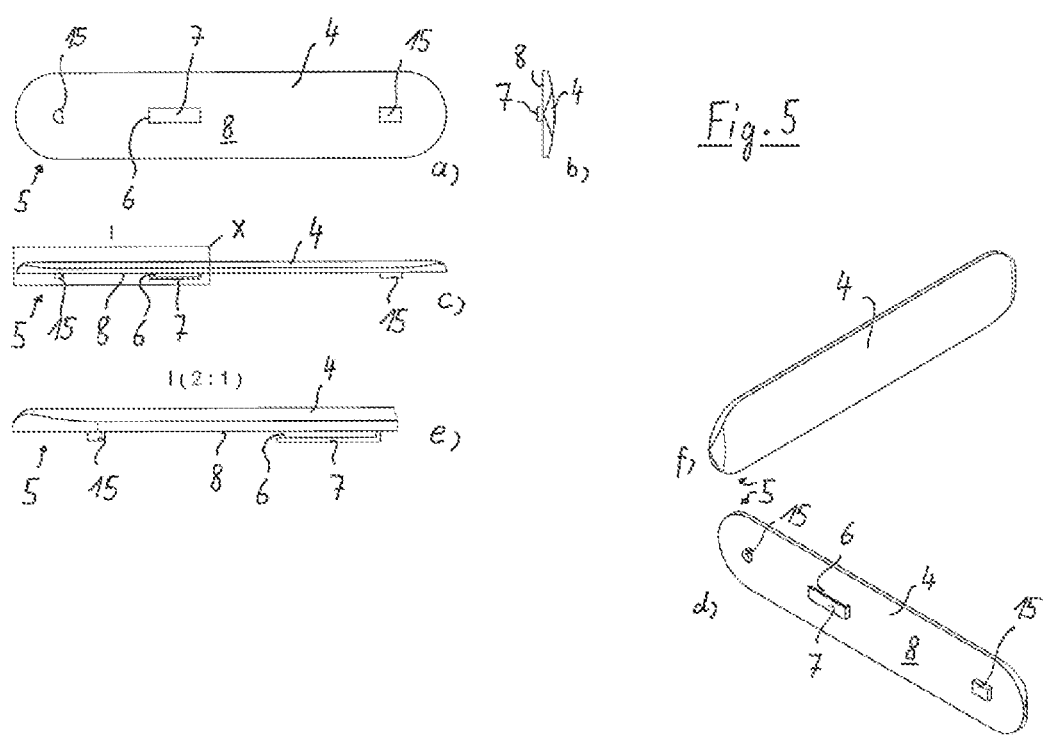
Figure 6:
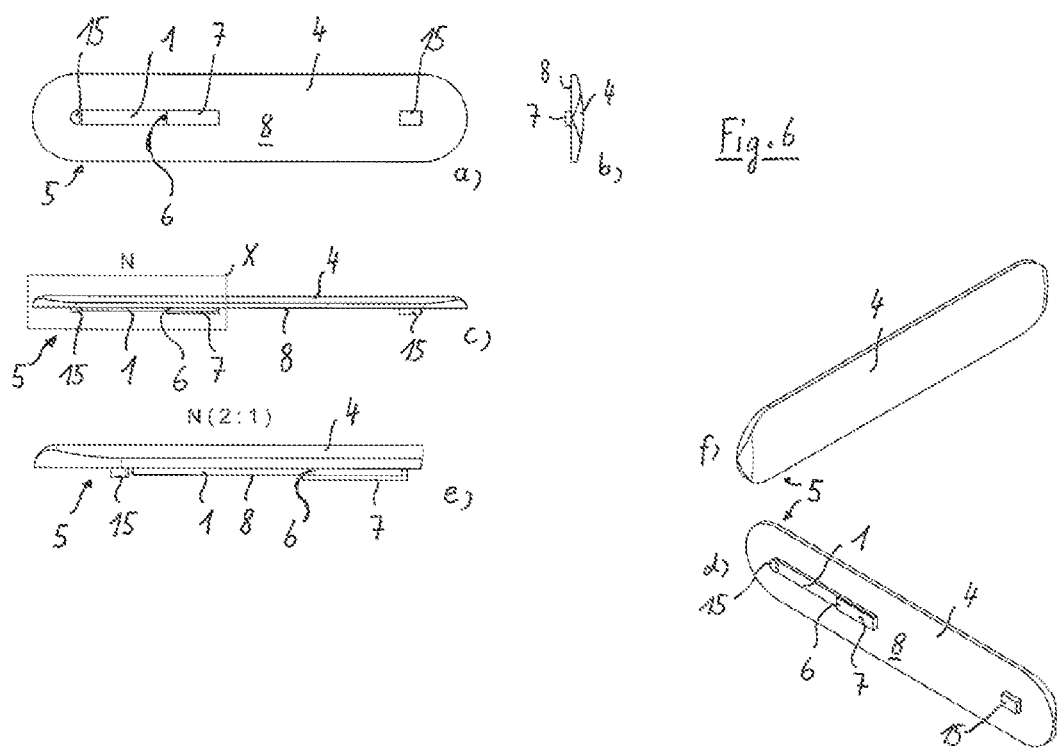

h) a perspective view of the device inserted into a slot of an object;

FIG. 4: shows a fourth embodiment of the device—in particular
- a) a view of the device from the front;
- b) a view of the device in a) from the right;
- c) a view of the device in a) and b) from the side;
- d) a view of the device in a)-c) in perspective;
- d') the detail Y from d);
- e) a device according to a)-d) inserted into a slot of an object;
- e') a section from e) taken along lone B-B;
- f) a section of e) taken along the line A-A with the transponder inserted;
- g) the detail X from f);
- h) a perspective view of the device inserted into a slot of an object;

FIG. 5: shows a fifth embodiment of the invention—in particular
- a) a view of the device from the front;
- b) a view of the device in a) from the right;
- c) a view of the device in a) and b) from the side;
- d) a view of the device in a)-c) in perspective;
- e) the detail X from c);
- f) an illustration from a perspective rotated by approximately 90° with respect to d);

FIG. 6: shows the embodiment according to FIG. 5, wherein Figures a) to f) correspond to the illustrations from FIG. 5, but with a transponder inserted;

FIG. 7: shows a protective cover for the fifth embodiment of the invention according to FIGS. 5 and 6—in particular
- a) a view of the protective cover from the front;
- b) a view of the protective cover in a) from the right;
- c) a view of the protective cover in a) and b) from the side;
- d) a view of the protective cover in a)-c) in perspective;
- e) the detail X from c);
- f) a further perspective view of the protective cover rotated by approximately 90° with respect to the illustration d);

FIG. 8: shows the fifth embodiment of the invention according to FIGS. 5 to 7 with the protective cover placed on the device—in particular
- a) a view of the device from the front;
- b) a view of the device in a) from the right;
- c) a view of the device in a) and b) from the side;
- d) a view of the device in a)-c) in perspective;
- e) the detail X from c);
- f) an illustration from a perspective rotated by approximately 90° with respect to d);

DETAILED DESCRIPTION

Figure 1:
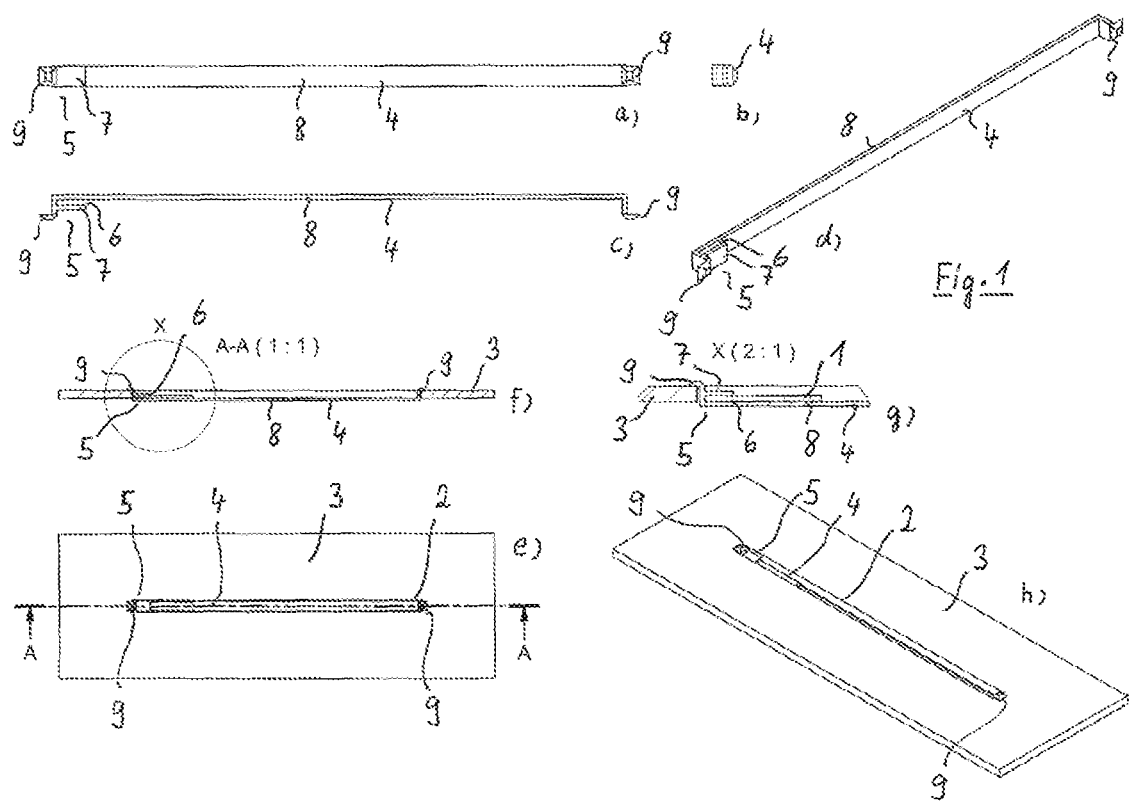
FIG. 1: shows a first embodiment of the device—in particular
  a) a view of the device from the front;
  b) a view of the device in a) from the right;
  c) a view of the device in a) and b) from the side;
  d) a view of the device in a)-c) in perspective;
  e) a device according to a)-d) inserted into a slot of an object;
  f) a section of e) taken along the line A-A with the transponder inserted;
  g) the detail X from f);
  h) a perspective view of the device inserted into a slot of an object.

FIG. 1 shows, in Figures a)-d), a first embodiment of a device according to the invention, and in Figures e)-h) the use of this device within a slot 2 of an object 3 with a transponder 1 inserted.

In this description, the term transponder is used not only for the actual transponder chip, but also for the component that contains the transponder. This is usually a larger component in which the transponder is potted, screwed, glued or installed in some other way. The component referred to as the transponder thus has a certain mechanical resistance and can also be resistant to external influences such as heat, pressure, liquids, etc.

The device is an insert part 4 made of plastics material, for example made of polyvinyl chloride or another plastics material or a mixture of several plastics materials, which is produced by injection-molding and which is substantially hard, but bendable and flexible. The insert part 4 is elongated in form and has a base 8. At one end 5 of the insert part 4, there is a receptacle 6 for a transponder. The receptacle 6 for the transponder is designed as a resilient web 7 for clamping the transponder 1 when it is inserted. On both sides of the insert part 4 there are hook-shaped stops 9, which are formed by the material being bent by 90° starting from the base 8 of the insert part, and then being bent again by 90° in the opposite direction, roughly producing a Z-shape when viewed from the side (see FIG. 1c)). The dimensions of the insert part 4 are chosen such that the length of the base 8 corresponds approximately to the length of the slot 2 within the object 3 in which the insert part 4 is to be inserted. In this way, the hook-shaped stops 9 overlap the ends of the slot 2 on the outside thereof when the insert part 4 is inserted into the slot 2, as shown in sub-figure f).

As sub-figure g) shows, the transponder 1 is arranged near the inner side of the slot 2—that is to say, facing away from the surface of the object 3, when the insert part 4 is inserted in the slot 2. This has the advantage of better transmission power, which has been confirmed by experiments.

The insert part 4 inserted into the slot 2 of the object 3 in this manner is firmly seated inside the slot 2, without the risk of slipping through into the inner cavity of the object 3, because it is held at the ends of the slot 2 by the hook-shaped stops 9. The transponder 1 is again firmly seated within the receptacle 6 because it is clamped by the resilient web 7.

After the insertion of the insert part 4 into the slot 2 of the object 3—i.e., after the insert part 4 has assumed the position shown in the sub-figures e)-h), the slot 2 is potted with a potting compound which is known per se, wherein the potting compound is applied inside the slot 2 and in its edge regions, and the insert part 4 is at least mostly, and optionally completely, covered.

The potting compound can be an adhesive or another one-component or two-component potting compound (binder/hardener system) known from the prior art.

The device according to the invention achieves the advantage that the transponder 1, when inserted into the slot 2 of the object 3, can no longer fall through and get lost in the inner cavity of the object 3, and it is also securely positioned at a fixed location in the region of the slot 2. As already described, tests have shown that the optimal position for the transponder 1 is at the end of the slot 2 and in the region of the inner side of the slot 2. In this way, optimal activity and transmission power of the transponder 1 are achieved.

Figure 2:
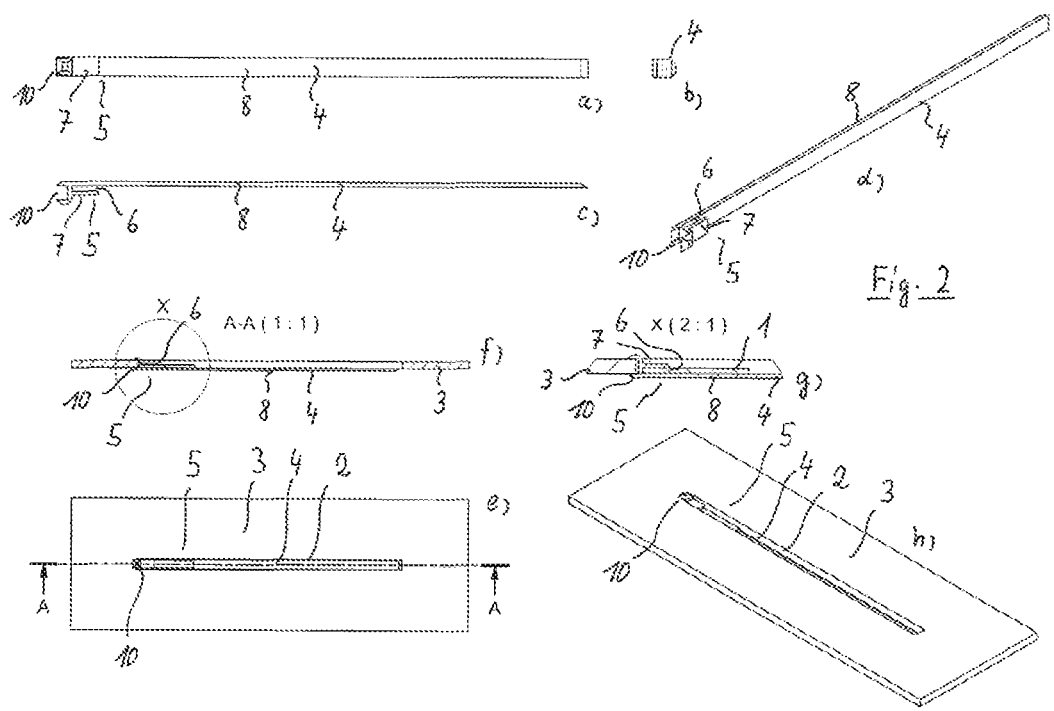
FIG. 2: shows a second embodiment of the device—in particular
  a) a view of the device from the front;
  b) a view of the device in a) from the right;
  c) a view of the device in a) and b) from the side;
  d) a view of the device in a)-c) in perspective;
  e) a device according to a)-d) inserted into a slot of an object;
  f) a section of e) taken along the line A-A with the transponder inserted;
  g) the detail X from f);
  h) a perspective view of the device inserted into a slot of an object.
Figure 3:
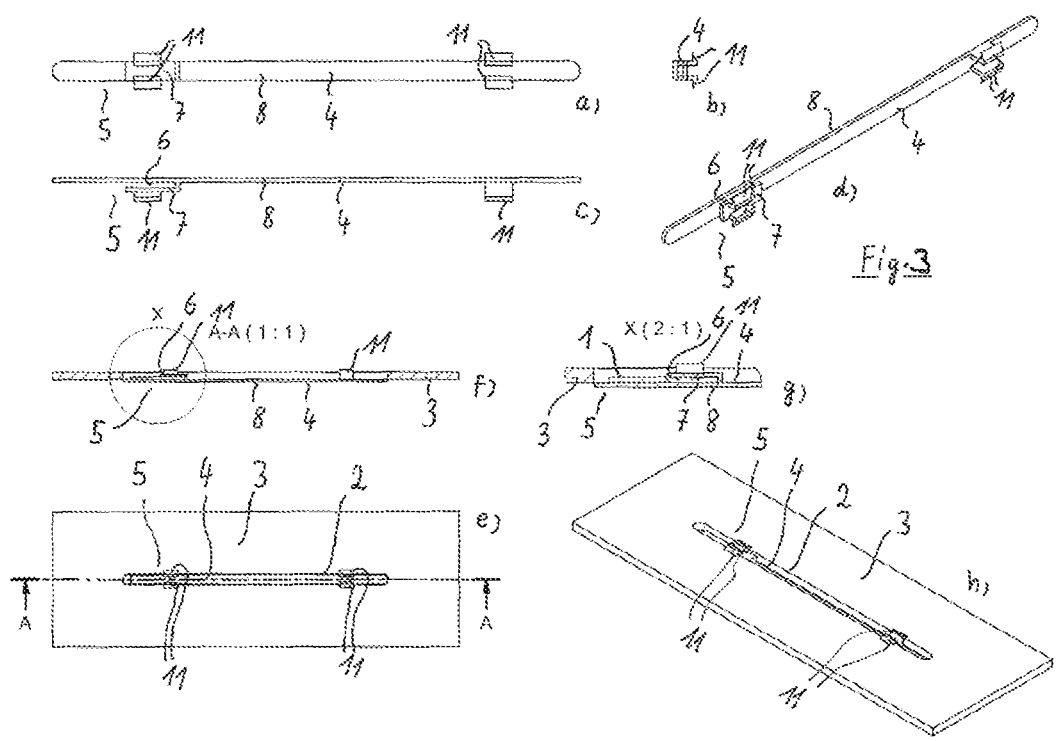
FIG. 3: shows a third embodiment of the device—in particular
  a) a view of the device from the front;
  b) a view of the device in a) from the right;
  c) a view of the device in a) and b) from the side;
  d) a view of the device in a)-c) in perspective;
  e) a device according to a)-d) inserted into a slot of an object;
  f) a section of e) taken along the line A-A with the transponder inserted;
  g) the detail X from f)

Alternative embodiments can be seen in FIGS. 2-4. The same components are designated with the same reference numerals. Likewise, the sub-figures a)-h) correspond in all of the FIGS. 1-4.

In the following, only the differences from the embodiment described with reference to FIG. 1 will be discussed in the description of the further embodiments.

In the embodiment according to FIG. 2, instead of the hook-shaped stops 9 arranged on both sides, the insert part 4 has a claw 10 at only one end, wherein the width of the claw 10 is such that it approximately corresponds to the thickness of the material of the object 3 in the region of the slot 2. The transponder 1 is clamped on the insert part 4 in a similar receptacle 6 with a resilient web 7.

The attachment of the insert part 4 to the object 3 is shown in the sub-figures e)-h). First, the transponder 1 is inserted into the receptacle 6 and the insert part 4 is then inserted into the slot 2 of the object 3, wherein the claw 10 engages over the end of the slot, thereby producing a secure holder. The other end of the insert part 4 remains free in the region of the underside of the slot 2.

This is followed by potting with a potting compound as described in relation to the embodiment according to FIG. 1.

The embodiment according to FIG. 3 differs from the embodiments according to FIGS. 1 and 2 in that, instead of the hook-shaped stops 9 or the claw 10, at least two—in the embodiment shown, four—lateral hooks 11 projecting upwards from the base 8 of the insert part 4 are provided. Two hooks are arranged in the region of one end of the insert part 4 and two are arranged in the region of the other end; however, both are not quite at the end of the insert part 4, and are rather at a distance from the ends of the insert part 4. They project upwards and then laterally from the base 8 of the insert part 4. In the embodiment shown, the two hooks 11 shown on the left are located on the resilient web 7 of the receptacle 6.

In the inserted state, the lateral hooks 11 overlap the slot 2 inside the object 3, as shown in FIG. 3 *h*), and in this way fix the insert part 4 inside the slot 2. This is then followed by potting with a suitable potting compound, the slot 2 being completely sealed.

In the further embodiment shown in FIG. 4, instead of the hook-shaped stops 9, claw 10 or lateral hooks 11 shown in the embodiments according to FIGS. 1-3, there is a total of four inclined surfaces 12 projecting from the base 8 in the region of the ends of the insert part 4, but at a distance from the ends rather than entirely at the ends, which, starting from the edges of the base 8, project slightly laterally outwards beyond the base 8 of the insert part 4—either by an oblique arrangement or by a corrugation or gradation. The insert part 4 is thus somewhat wider in the region of the inclined surfaces 12 than in the region of the base 8. Since the base 8 has exactly the width of the slot 2 of the object 3, the inclined surfaces 12 are wider than the slot 2; this results in a clamping connection between the insert part 4 and the slot 2 when the insert part 4 is pressed into the slot 2, as shown in FIG. 4 *h*) and FIG. 4 *e'*). The resilient and slightly outwardly directed inclined surfaces 12 produce the clamping effect. In this embodiment, the insert part 4 disappears completely inside the slot 2. In a last step, the slot 2 is also potted with a potting compound.

In a further embodiment, which is not shown, the transponder can be arranged as a single piece inside the device—for example, potted, molded, or incorporated in another way therein and encapsulated by the device. The device thus forms a one-piece unit with the transponder.

As described above, the slot can be introduced into the object by cutting, lasering, or shaping using standard material-removing or machining processes, such as by sawing, milling, lasering, cutting, etc. The slot can be introduced before or after the surface treatment of the component—that is, before or after painting, galvanizing or powder-coating.

In a further, alternative embodiment, the slot can be provided with an undercut in order to facilitate the flowing of the potting compound, and thus better fixing of the device within the slot, since the potting compound flows around the device. The slot preferably has a molded edge configuration which is matched to the edge configuration of the device, in order to achieve a better connection of the device to the slot—for example, a latching or meshing.

The embodiment according to FIG. 5 differs from the embodiments according to FIGS. 1 to 4 in that there is no insertion of the insert part into the slot of the object; rather, the insert part 4 is attached from behind to the object (accessible from the rear), wherein the resilient web 7 and optionally further positioning aids 15 on the base 8 of the insert part 4 are inserted into the slot of the object. The attachment of the insert part 4 inside the slot of the object is not done mechanically, but rather by large-area gluing, which is possible in this embodiment because the base 8 of the insert part 4 is made much wider than the slot—i.e. comes to lie behind the slot—such that the entire region of the very wide base 8 rests on the back side of the object and can be glued thereto. FIGS. 5*a*, *b, d* and *f* show this very clearly. It can be seen that the base 8 of the insert part 4 is substantially wider than the previously described embodiments, and clearly exceeds the width of the resilient web 7 and also of the positioning aids 15 which engage in the slot of the object.

As in the other embodiments, a receptacle 6 for a transponder 1 is formed at one end 5 of the insert part 4 by a resilient web 7, which extends from the base 8 of the insert part 4 in a hook shape, wherein the gap between the web 7 and the base 8 in this case as well is undersized with respect to the thickness of the transponder 1.

The inserted transponder 1 can be seen in FIG. 6. As particularly shown in FIGS. 6*a*, 6*c*, 6*d* and 6*e*, this projects in the direction of the slot of the object beyond the resilient web 7 and almost completely fills the space between the resilient web 7 and the left positioning aid 15. The transponder 1 in this case has an elongated shape and, when it is installed later, is inserted completely into the slot of the object.

The protective cover 16 shown in FIG. 7 is provided to shield the transponder 1, which is essentially unprotected in the slot of the object, against external influences such as strikes, impacts, weather conditions, etc. All sub-figures in FIG. 7 show the protective cover 16. This has a slightly protruding elongated positioning aid 17 which engages in the slot of the object during later assembly, and thus allows the protective cover 16 to be positioned more easily. Otherwise, the dimensions of the protective cover are similar to those of the insert part 4, but somewhat narrower.

The installed combination of the insert part 4 and protective cover 16 is shown in FIG. 8. Here, the insert part 4 with the transponder 1 is located in a slot (not shown) of an object, wherein the transponder 1, which is located in the receptacle 6 between the base 8 and the resilient web 7 of the insert part 4, is protected by the protective cover 16 attached over it. It can be clearly seen how the positioning aid 17 of the protective cover 16 engages in the slot (not shown here) of the object and thus ensures a simple positioning of the protective cover 16 over the slot and, in particular, over the transponder 1 to be protected.

The invention claimed is:

1. A device for inserting a transponder into a slot of an object, the device being an insert part which has approximately the length and width of the slot and which can be connected to the slot, and which has a receptacle for the transponder, wherein the receptacle is arranged on an end of the insert part facing an end of the slot, and has a resilient web for clamping the transponder, when inserted, between a base of the insert part and the resilient web, wherein the space between the web and the base is undersized with respect to the thickness of the transponder.

2. The device according to claim 1, wherein the insert part is configured as an injection-molded part or as a part made of plastics material in 3D printing.

3. The device according to claim 1, wherein the base is located in a region of an inner side of the slot when the device is in the inserted state.

4. The device according to claim 1, wherein the device comprises hook-shaped stops on both sides, which overlap the ends of the slot on an outside thereof when the device is in the inserted state.

5. The device according to claim 1, wherein the device comprises a claw at one end which can be inserted into the end of the slot.

6. The device according to claim 1, wherein the device comprises at least two lateral hooks which project upwards from the base and engage laterally around the slot when the device is in the inserted state.

7. The device according to claim 6, wherein at least one hook is arranged in the region of the receptacle for the transponder.

8. The device according to claim 1, wherein the device comprises at least two lateral inclined surfaces which project upwards from the base and which, when the device is in the inserted state, push against and clamp against the inner side surfaces of the slot.

9. The device according to claim 1, wherein the receptacle has a screw, rivet, hook-and-loop, adhesive or clamp connection for the transponder.

10. The device according to claim 1, wherein the transponder forms a one-piece component together with the device.

11. The use of a device according to claim 1, wherein the object is a component of a scaffold or formwork.

12. The use according to claim 11, wherein the scaffold or the formwork consists of metal at least in the region of the slot.

13. A component for formwork or scaffolding, comprising a device according to claim 1.

14. A system, comprising:
an object defining a slot;
a transponder; and
a device for inserting the transponder into the slot, the device being an insert part having approximately a length and width corresponding to the length and width of the slot and which can be connected to the slot, and which has a receptacle for the transponder, wherein the receptacle is arranged on an end of the insert part facing an end of the slot, and has a resilient web for clamping the transponder, when inserted, between a base of the insert part and the resilient web, wherein the space between the web and the base is undersized with respect to the thickness of the transponder.

* * * * *